United States Patent [19]
Hickey

[11] 3,815,650

[45] June 11, 1974

[54] PROTECTION OF AIRCRAFT

[76] Inventor: Christopher Daniel Dowling Hickey, 5 Heathside, Hinchley Wood, England

[22] Filed: June 22, 1972

[21] Appl. No.: 265,354

[30] Foreign Application Priority Data
June 25, 1971 Great Britain.................... 30010/71

[52] U.S. Cl.................. 150/52 R, 53/22 B, 206/205
[51] Int. Cl............................................. B65d 37/00
[58] Field of Search..... 150/52 R, 52 K; 206/46 PV, 206/DIG. 30; 244/1 R; 53/12, 22 R, 22 A, 22 B

[56] References Cited
UNITED STATES PATENTS

| | | | |
|---|---|---|---|
| 2,168,913 | 8/1939 | Middleton | 150/52 R X |
| 2,717,017 | 9/1955 | Feasey | 150/52 R |
| 2,814,382 | 11/1957 | Lassiter | 206/46 PV |
| 3,101,109 | 8/1963 | Hawley | 150/52 R |
| 3,610,516 | 10/1971 | Esty | 206/46 PV X |

FOREIGN PATENTS OR APPLICATIONS
586,304  3/1947  Great Britain.................... 150/52 R

*Primary Examiner*—Donald F. Norton
*Attorney, Agent, or Firm*—Hall & Houghton

[57] ABSTRACT

An envelope made wholly or partly of flexible impermeable material, and adapted to enclose an aircraft, there being an access opening in the envelope, the envelope including a re-usable airtight fastener, operable to close and seal the opening against ingress of air into the envelope, the envelope also having apertures through which wheels of an aircraft can protrude, together with sealing means for sealing said apertures to parts of the aircraft's undercarriage, and valve means controlling an outlet for air from the interior of the envelope whereby suction may be applied to and maintained within the envelope to collapse said envelope into closely fitting engagement with the aircraft.

11 Claims, 5 Drawing Figures

PATENTED JUN 11 1974 3,815,650
SHEET 1 OF 2

PATENTED JUN 11 1974 3,815,650
SHEET 2 OF 2
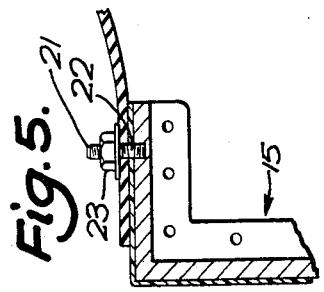
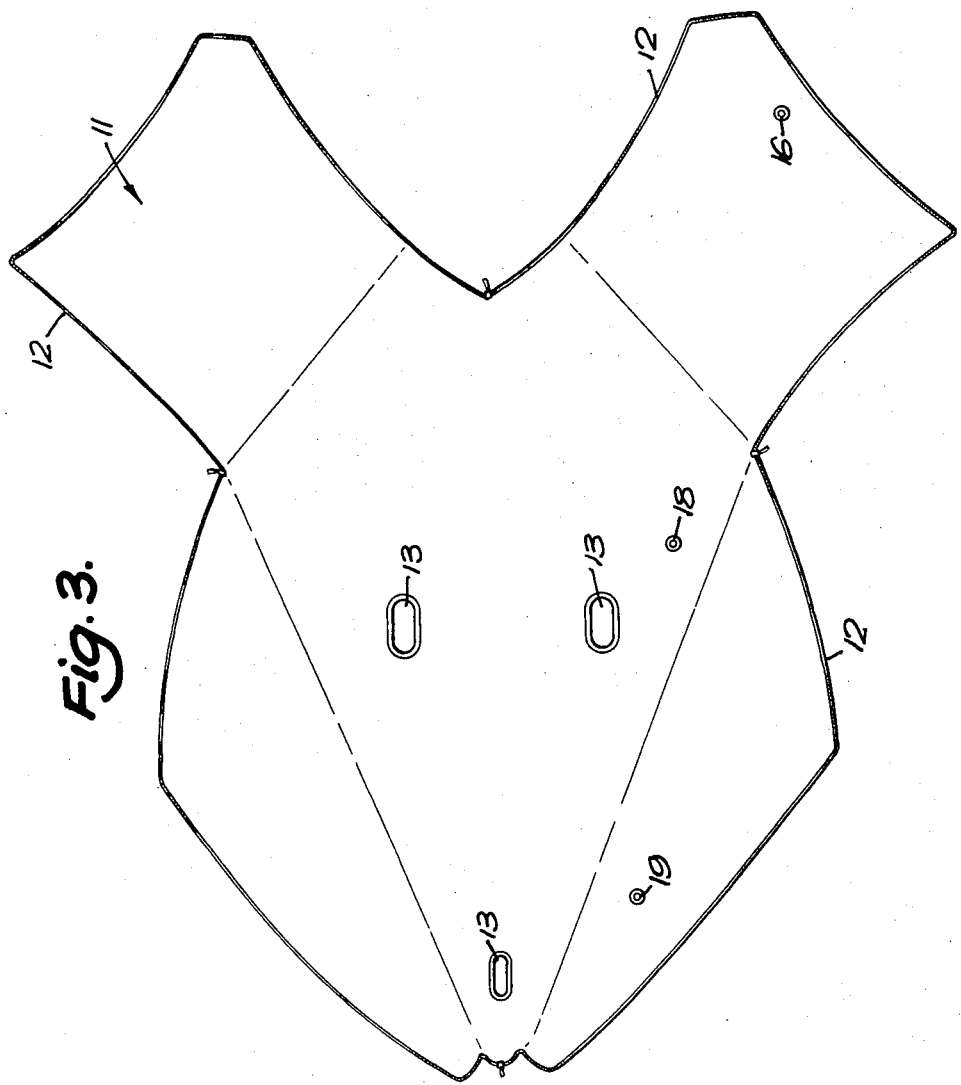

PROTECTION OF AIRCRAFT

BACKGROUND TO THE INVENTION

This invention relates to the protection of grounded aircraft from deterioration due to rust or other contamination. Protection may also be afforded to the engines, instruments and electronic equipment contained in the aircraft.

DESCRIPTION OF THE PRIOR ART

In the past weatherproof covers have been placed over aircraft to protect them while they are on the ground, but these covers have had the disadvantage that they may chafe and may be blown off or torn to shreds by quite light winds. It has also been known to use portable inflatable hangars which may be erected over the aircraft to give protection both to the aircraft and to persons working on them. The present invention relates to the protection of aircraft and associated equipment from deterioration and/or the elements.

SUMMARY OF THE INVENTION

The present invention provides an envelope made wholly or partly of flexible impermeable material, and adapted to enclose an aircraft, there being an access opening in the envelope, the envelope including a re-usable airtight fastener, operable to close and seal the opening against ingress of air into the envelope, the envelope also having apertures through which wheels of an aircraft can protrude, together with sealing means for sealing said apertures to parts of the aircraft's undercarriage, and valve means controlling an outlet for air from the interior of the envelope whereby suction may be applied to and maintained within the envelope to collapse said envelope into closely fitting engagement with the aircraft.

The airtight fastener may also be arranged to seal said opening against passage of air out of the envelope through the opening.

According to one preferred feature of the invention there may be clamps which fit round the wheel apertures, and these clamps may secure the envelope to the undercarriage oleo struts.

In a preferred form the invention may include a pump arranged to extract the air from within the envelope, and to maintain a certain reduction in air pressure within the envelope. For example there may be a pressure sensitive switch which switches on the pump when the pressure in the envelope rises above a chosen value, and switches off the pump when the pressure in the envelope is at or below that value.

In this form it is further preferred that in addition to the pressure sensitive switch, there is a safety valve incorporated in the envelope to prevent the pressure in the envelope reaching such a low value that the aircraft might be crushed. This value serves as an additional safeguard should the pressure sensitive switch fail to switch off the pump.

In one possible form of the invention there may be means to replace the air within the envelope by an inert gas, or dried air to prevent the deterioration of equipment within the aircraft due to the effects of water vapour or atmospheric oxygen.

According to a feature of the invention the same envelope may be used for a number of different types of similarly sized aircraft, having different undercarriage configurations. This may be achieved by the envelope having a single (nosewheel) aperture, and a plurality of appropriately spaced (mainwheel) apertures arranged for application to the undercarriages of different aircraft types. Furthe sealable apertures, for example to enable access to, and maintenance of, certain selected parts of the aircraft, e.g. the cockpit, engines, etc. may be provided as required, so that servicing may be effected without the need to remove the whole cover.

The airtight fastener preferably comprises one or more airtight sliding clasp fasteners. Examples of such fasteners are disclosed in British Patents Nos. 940461, dated Aug. 28, 1962, and 1201290, dated Apr. 9, 1969.

The clasp fastener or fasteners may be arranged so that the envelope can be opened out into a substantially flat sheet. Alternatively or in addition the envelope may be separable into a plurality of sheet sections.

It may be that ends of the or some of the clasp fasteners are adjacent one another in which case it is necessary to provide means to seal any gap between the adjacent ends. Such means may be as disclosed in British Patent No. 913113, dated Feb. 25, 1969.

The invention also provides a method for the protection of aircraft which comprises the steps of placing an aircraft in an envelope made wholly or partly of flexible impermeable material, the envelope having a re-usable openable airtight fastener, and closable apertures for the aircraft's undercarriage; closing the fastener and sealing the apertures to make the envelope airtight; and withdrawing air from the interior of the envelope.

In a particularly preferred form at least some of the air withdrawn from the envelope may be replaced by an inert gas such as nitrogen.

BRIEF DESCRIPTION OF THE DRAWINGS

A specific embodiment of this invention will now be described by way of example with reference to the accompanying drawings in which:

FIG. 3 is a plan view of the envelope opened out,

FIG. 5 illustrates the use of such a clamp.

DESCRIPTION OF ONE EXAMPLE OF THE INVENTION

Figure 1:
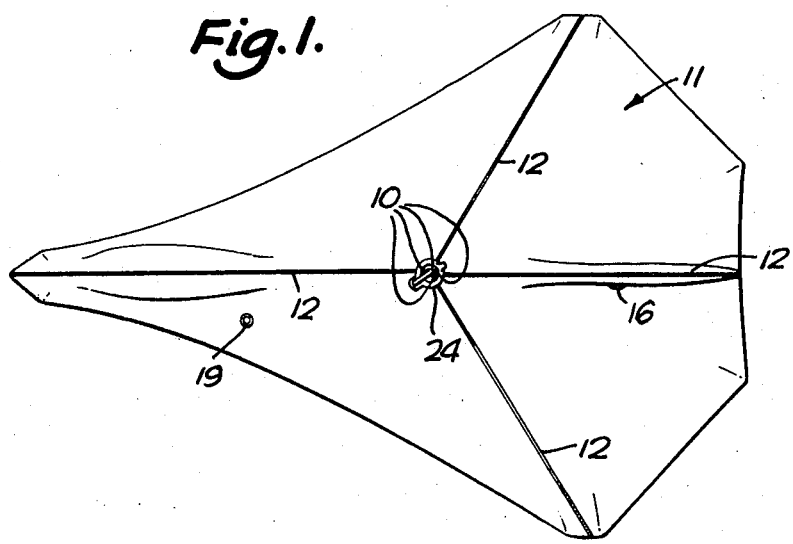
FIG. 1 shows diagrammatically a plan view of an envelope enclosing an aircraft.
Figure 2:
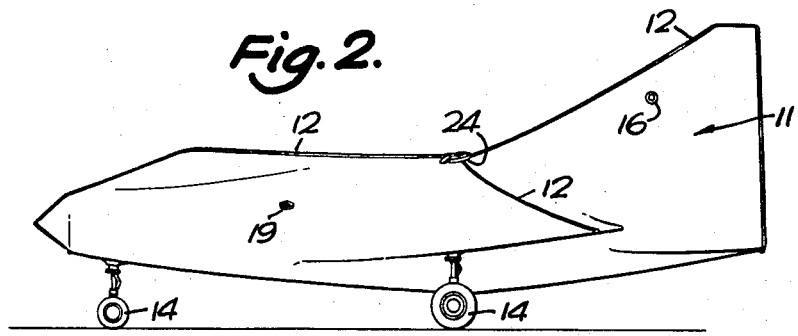
FIG. 2 shows a side view of the envelope enclosing the aircraft.

An aircraft, e.g. a military aircraft dispersed perhaps to a forward air strip, or outside storage dispersal, has a protective covering comprising an envelope 11 of flexible impermeable material, which envelope is shaped to fit over the whole of the aircraft, and which has four airtight sliding clasp fasteners 12 which can be opened and closed at will. In the closed position the four sliders 10 which operate the fasteners are arranged adjacent as shown in FIG. 1. A seal 24 of the form disclosed in British Patent No. 913113 is provided to seal the gap between the ends of the clasp fasteners. Also embodied within the envelope are ties (not shown) to enable the cover to be roughly positioned in relation to the lines of division of the fasteners thus removing or reducing lateral closing stresses from the fasteners.

The envelope has three apertures 13 disposed to receive the wheels 14 of the aircraft, and prior to covering the aircraft it is wheeled on to the opened out envelope (while the envelope is flat on the ground) so that the undercarriage rests on the ground surface, protruding through the apertures.

The envelope 11 is then folded over the aircraft and the fasteners 12 are closed to seal the envelope and thus exclude air from passing therethrough. The parts of the envelope near the wheel apertures are gathered up and are clamped around the wheel oleo struts by double-flanged clamps 15 (as shown in more detail in FIGS. 4 and 5). When the envelope is airtight, sufficient air is withdrawn through a non-return valve 16, to draw the envelope tightly around the aircraft, whilst the aircraft may still be moved easily upon its wheels. Holes (17) for a towing yoke are embodied in the oleo strut clamps for this express purpose. A safety relief valve 18 guards against the possibility of an evacuating pump reducing the pressure to a level which would damage the aircraft. There is a valve 19 through which inert gas or dry air can be introduced.

Current practice is to purge and inflate some container with an inert gas to provide the desired environment. It will be appreciated that this is extremely wasteful. According to the invention air is first extracted, so the volume of air (and thus moisture or oxygen) in the container will be considerably reduced. It follows therefore that the amount of dried air or inert gas needed to purge or provide a conditioned environment within the vacuumised envelope will be correspondingly reduced. The saving in gas is therefore considerable. Furthermore the higher external air pressure causes the envelope to grip the aircraft, thus reducing chafing and hence wear of the envelope.

Figure 4:
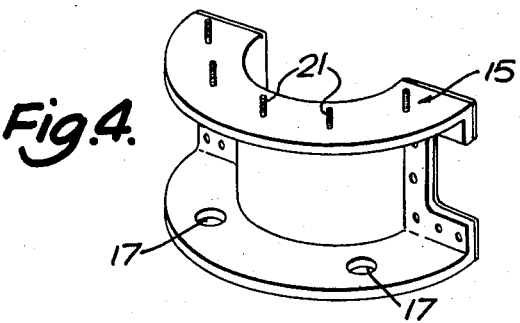
FIG. 4 shows a clamp for an oleo strut.

FIGS. 4 and 5 illustrate particularly the manner in which the wheel apertures may be sealed to the oleo struts. On the upper faces of the clamps 15 there are studs 21 which are arranged to pass through holes 22 adjacent the edges of the apertures 13 and 14. The studs 21 have screw-down nuts 23 by means of which the apertures may be secured to the clamps. The surfaces of the clamps are of resilient impermeable material to provide an airtight joint on the oleo legs. The two halves of the clamps are mated up around the leg and then secured by means of bolts not shown.

The use of four sliding clasp fasteners permits the envelope to be opened out as a substantially flat sheet which greatly facilitates loading of the aircraft into the envelope.

The invention is not restricted to the foregoing example. There may for instance be more than three apertures 13, either so that different configurations of undercarriage may be accommodated or to recess other projections (e.g. radio antennae) or to permit access to parts of the aircraft (e.g. the engine) for routine inspection and maintenance. Means will be provided to seal apertures which are not in use.

Instead of four sliding clasp fasteners any number may be used. Where any two fastener ends are adjacent a seal such as 24 should be provided. The fasteners may be such that the envelope is separable into a plurality of sheet portions. This facilitates transport and storage of the envelope. Furthermore the size and shape of the envelope may be varied by adding or removing sheet portions.

I claim:

1. An enclosure for an aircraft comprising:
    a. An envelope formed at least partly of flexible impermeable material and having an access opening, an outlet, and also apertures positioned and sized for the protrusion of aircraft wheels therethrough;
    b. A re-usable air tight fastener disposed in said envelope for closing and sealing said access opening against ingress of air into the envelope;
    c. Means for sealing said apertures to parts of an enclosed aircraft under carriage; and
    d. Valve means in said envelope for controlling said outlet and for allowing air only to escape from said outlet, whereby suction can be applied to and maintained within the envelope to collapse said envelope into closely fitting engagement with an aircraft.

2. An envelope as claimed in claim 1 in which the fastener is also arranged to seal said opening against passage of air out of the envelope through the opening.

3. An envelope as claimed in claim 1 in which there are clamps which fit around the wheel apertures and secure the envelope to the undercarriage oleo struts.

4. An envelope as claimed in claim 1 including a pressure safety relief valve to prevent the pressure in the envelope falling to such a low level that the aircraft might be crushed.

5. An envelope as claimed in claim 1 including means to replace at least some of the air in the envelope with an inert gas or with dried air.

6. An envelope as claimed in claim 1 having a plurality of aircraft wheel apertures to accommodate a plurality of undercarriage configurations, there being means to seal any apertures not in use.

7. An envelope as claimed in claim 1 in which the airtight fastener comprises one or more airtight sliding clasp fasteners.

8. An envelope as claimed in claim 7 in which the clasp fastener or fasteners are arranged so that the envelope can be opened out into a substantially flat sheet.

9. An envelope as claimed in claim 7 in which two or more clasp fastener ends are adjacent, there being means to seal any gap between said adjacent ends.

10. A method for the protection of aircraft which comprises the steps of placing an aircraft in an envelope made wholly or partly of flexible impermeable material, the envelope having a re-usable openable airtight fastener, and closable apertures for the aircraft's undercarriage; closing the fastener and sealing the apertures to make the envelope airtight; and withdrawing air from the interior of the envelope.

11. A method as claimed in claim 10 in which at least some of the air withdrawn from the envelope is replaced by dried air or an inert gas (e.g. nitrogen).

* * * * *